United States Patent
Wang

(10) Patent No.: US 6,306,497 B1
(45) Date of Patent: Oct. 23, 2001

(54) PRESSURE-SENSITIVE ADHESIVE ARTICLES FOR USE ON TRANSPARENT IMAGING FILMS

(75) Inventor: Yongzhong Wang, West Warwick, RI (US)

(73) Assignee: Arkwright Incorporated, Fiskeville, RI (US)

( * ) Notice: Subject to any disclaimer, the term of this patent is extended or adjusted under 35 U.S.C. 154(b) by 0 days.

(21) Appl. No.: 09/260,731

(22) Filed: Mar. 3, 1999

Related U.S. Application Data

(60) Provisional application No. 60/076,515, filed on Mar. 3, 1998, now abandoned.

(51) Int. Cl.[7] .................................................. B32B 5/16
(52) U.S. Cl. ........................ 428/340; 428/141; 428/327; 428/343; 428/355 AC; 428/355 R; 428/355 EN
(58) Field of Search ...................... 428/195, 340, 428/141, 343, 327, 355 AC, 355 R, 355 EN, 480, 535, 537.5, 356, 922

(56) References Cited

U.S. PATENT DOCUMENTS

| | | |
|---|---|---|
| 3,691,140 | 9/1972 | Silver . |
| 3,857,731 | 12/1974 | Merrill, Jr. et al. . |
| 4,049,483 | 9/1977 | Loder et al. . |
| 4,166,152 | 8/1979 | Baker et al. . |
| 4,855,170 | 8/1989 | Darvell et al. . |
| 5,118,750 | 6/1992 | Silver et al. . |
| 5,192,612 | 3/1993 | Otter et al. . |
| 5,266,402 | 11/1993 | Delgado et al. . |
| 5,489,474 * | 2/1996 | Shinoda et al. ..................... 428/343 |
| 5,571,617 | 11/1996 | Cooprider et al. . |
| 5,611,847 | 3/1997 | Guistina et al. . |
| 5,612,136 | 3/1997 | Everaerts et al. . |
| 5,614,576 | 3/1997 | Rutherford et al. . |
| 5,614,577 | 3/1997 | Sasaki et al. . |
| 5,616,670 | 4/1997 | Bennett et al. . |
| 5,626,955 | 5/1997 | Goetz et al. . |
| 5,902,678 * | 5/1999 | Konda et al. ....................... 428/345 |
| 6,025,071 * | 2/2000 | Cameron et al. ................... 428/355 |

\* cited by examiner

*Primary Examiner*—Bruce H. Hess
*Assistant Examiner*—B. Shewareged
(74) *Attorney, Agent, or Firm*—Birch, Stewart, Kolasch & Birch, LLP

(57) ABSTRACT

This invention provides a pressure-sensitive adhesive article, such as a tape, comprising a backing and a pressure-sensitive adhesive coating. The adhesive coating comprises microspheres chemically bonded to a cross-linked polymer network. The adhesive coating is prepared from a mixture comprising a multifunctional aziridine cross-linking agent; a microsphere adhesive having carboxylic acid functional groups; and a binder adhesive having carboxylic acid functional groups. The cross-linked adhesive polymer network provides high cohesive strength and microspheres in the adhesive provide a method of controlling the peel strength. The pressure-sensitive adhesive tapes are particularly suitable for use on transcript imaging films, where they can be cleanly removed from the film.

11 Claims, No Drawings

PRESSURE-SENSITIVE ADHESIVE ARTICLES FOR USE ON TRANSPARENT IMAGING FILMS

CROSS-REFERENCE TO RELATED APPLICATIONS

This application claims the benefit of U.S. provisional patent application 60/076,515 having a filing date of Mar. 3, 1998, abandoned.

BACKGROUND OF THE INVENTION

1. Field of the Invention

This invention relates to a pressure-sensitive adhesive article, such as a tape, comprising a backing and a pressure-sensitive adhesive coating. The adhesive coating comprises microspheres chemically bonded to a cross-linked polymer network.

2. Brief Description of the Related Art

Transparent imaging sheets (or films) are widely used as overhead transparencies for overhead projectors during visual presentations. These transparent imaging sheets are processed in copiers and printers having optical sensing devices that detect only opaque imaging materials, so opaque paper or film must be used to render part of the transparent imaging sheet opaque. Typically, a removable and repositionable opaque pressure-sensitive adhesive (PSA) paper or film stripe is placed on one edge of the non-imaging surface of the transparent imaging sheet. The PSA paper stripe is usually discarded after imaging so that the imaged sheet can be completely viewed.

Various conventional adhesives are used to coat the PSA paper stripe so that it can adhere to the transparent imaging sheets, but two problems have been found with conventional adhesives.

One problem is that the adhesion between the PSA paper stripe and the transparent imaging sheet increases over time causing the stripe to tear on removal. The base transparent films used to make transparent imaging sheets are typically polyester films such as poly(ethylene terephthalate) (PET) films. The imaging side of the base PET film being is coated with an ink or toner receptive coating. The non-imaging side of the base PET film is either not coated, or coated with a back-coating (primer) for better sheet handling. (In some instances, the transparent imaging sheets are coated with an ink or toner receptive coating on both sides.) The adhesive on the paper stripe may interact with the coating on the non-imaging side of the PET films at elevated temperatures (such as temperatures occurring in a copier machine), resulting in increased peel strength between the stripe and PET film. When a person attempts to remove the paper stripe from the PET film, the stripe may tear due to this increased peel strength.

In order that the PSA paper stripe can more easily be removed, microsphere adhesives are used in making the adhesive for the stripe. In microsphere adhesives, inorganic and organic microspheres are incorporated into an adhesive system. Microsphere adhesives are known in the art.

For example, Merrill, Jr. et al., U.S. Pat. No. 3,857,731 discloses a pressure-sensitive sheet material comprising a substrate having a binder matrix bonded to at least one of its surfaces. Tacky elastomeric copolymer microspheres protrude from the exposed surface of the binder. The microspheres are prepared by an aqueous polymerization technique utilizing emulsifiers and contain 95 to 99 weight percent acrylate monomer and 5 to 1 weight percent ionic monomer, maleic anhydride, or a mixture thereof. The binder compound is compatible with the microspheres. Relatively hard resins such as epoxies and nitrocellulose and relatively soft resins such as acrylates and vinyl ethers are described as being suitable binder compounds.

Loder et al., U.S. Pat. No. 4,049,483 discloses a hot melt adhesive system which has pressure-sensitive characteristics at room temperature comprising a heat-activatable hot melt adhesive containing therein inherently tacky elastomeric microspheres.

The second problem with conventional adhesives is their low cohesive strength. Paper stripes coated with the adhesives described above, can meet the peel strength requirement for transparent imaging sheets (e.g. easy removal from a transparent imaging sheet). However, stripes with this type of adhesive will leave residue on the imaging sheet after imaging or over long periods of time with no imaging. The residue appears as a dark stripe on the imaging sheet in overhead projector presentations and is aesthetically undesirable. The problem is likely due to the low cohesive strength of the adhesive, allowing microspheres in the adhesive to migrate to the imaging sheets and form residue. The following patents describe the possible use of cross-linking agents to improve the cohesive strength of certain adhesive systems.

Goetz, U.S. Pat. No. 5,626,955 discloses a pressure-sensitive adhesive tape, that employs a water-absorptive backing, a microparticle-containing pressure-sensitive adhesive, and a water-dispersible component. The microparticle component is comprised of polymeric, elastomeric, solvent insoluble but solvent dispersible microparticles. The patent discloses that these spheres may be inherently pressure-sensitive and cross-linked if desired.

Cooprider et al., U.S. Pat. No. 5,571,617 discloses a coated sheet material comprising a backing and a coating of a repositionable pressure-sensitive comprising a plurality of solid microspheres, a polymeric stabilizer, and a surfactant. The microsphere adhesive composition may also contain a crosslinking agent. The patent describes useful crosslinking agents as multifunctional (meth)acrylates and divinylbenzene.

Delgado et al., U.S. Pat. No. 5,266,402 discloses a pressure-sensitive adhesive comprising an acrylate matrix and swellable elastomeric acrylate microspheres. Useful microspheres are described as being hollow swellable elastomeric microspheres having discrete boundaries and made by conventional processes. The pressure-sensitive adhesive is made by mixing the elastomeric microspheres into an alkyl acrylate monomer and then adding a copolymerizable monomer and initiator, forming an interpenetrating polymer network within the boundaries of the microspheres. The patent discloses that when superior cohesive strengths are desired, the adhesive matrix may also be cross-linked and that multiacrylates such as 1,6 hexanediol diacrylate are preferred cross-linking agents.

Darvell et al., U.S. Pat. No. 4,855,170 discloses pressure-sensitive adhesive tape products. The tape products are made by applying to a sheet backing, a tacky adhesive which contains and completely surrounds hollow, resilient polymeric microspheres. The patent discloses that the specific type of pressure-sensitive adhesive used is not critical and can be of the rubber-resin type or the so-called "acrylate" adhesives. The patent discloses that the polymeric microspheres can be added to the adhesive matrix after the adhesive matrix has been polymerized, or prior to polymerization of the adhesive matrix. The patent also discloses that conventional adhesives such as dyes, pigments, fumed silica, chopped fibers, hollow glass microspheres, fillers, catalysts, cross-linking agents, and the like can be added to the adhesive.

In view of the foregoing problems with conventional adhesives on transparent imaging films, there is a need for a pressure-sensitive adhesive article having high cohesive strength which can be easily removed from imaging sheets. The present invention provides such adhesive articles.

SUMMARY OF THE INVENTION

The present invention provides a pressure-sensitive adhesive article comprising a backing material coated with a pressure-sensitive adhesive coating comprising microspheres chemically bonded to a cross-linked polymer network. The pressure-sensitive adhesive coating is prepared from a mixture, comprising about 0.001 to about 2% by solid weight of a multifunctional aziridine cross-linking agent; about 30 to 80% by solid weight of a microsphere adhesive having carboxylic acid functional groups; and about 20 to 70% by solid weight of binder adhesive having carboxylic acid functional groups.

Preferably, the pressure-sensitive adhesive article is in the form of a tape, and the backing material is either latex-saturated paper, plain paper, or clay-coated paper. Preferably, the binder adhesive is a carboxylated acrylic adhesive, and the microsphere adhesive is an acrylic adhesive. The pressure-sensitive adhesive coating is preferably prepared by forming an aqueous mixture, and the weight of the adhesive coating is preferably 5 to 18 grams per square meter ($g/m^2$).

This invention also encompasses transparent imaging films with the above-described pressure-sensitive articles adhered to a surface of the films.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

The present invention provides a pressure-sensitive adhesive (PSA) article comprising a backing material coated with a pressure-sensitive adhesive coating comprising microspheres chemically bonded to a cross-linked binder adhesive polymer network. The adhesive article is preferably in the form of a removable and repositionable tape or label. The tape or label can be repeatedly adhered to and removed from a substrate, such as a transparent imaging sheet, without substantial loss of adhesion capability. The PSA article is particularly suitable for use on transparent imaging sheets having an ink or toner receptive coating, but can be used on other substrates as well.

The adhesive coating comprises microspheres chemically bonded to a cross-linked binder polymer network. In some instances, when the adhesive is coated onto a backing material (e.g., paper) to form the PSA article, a portion of the microspheres may protrude from the exposed surface of the adhesive coating. The PSA article is then applied to a substrate, such as a transparent imaging film. The protruding microspheres reduce the available contact area between the adhesive coating and substrate, controlling the peel strength between the PSA article and substrate. Thus, the PSA article can be easily removed from the substrate. At the same time, the cohesive strength of the adhesive coating is high due to the coating comprising a cross-linked binder polymer network having microspheres chemically bonded therein.

Conventional microsphere adhesives having carboxylic acid functional groups may be used in preparing the adhesive coatings of this invention. Silver, U.S. Pat. Nos. 3,691,140 and Baker et al., 4,166,152 disclose methods for making inherently tacky elastomeric copolymeric microspheres suitable for use as microsphere adhesives. Microsphere adhesives containing microspheres covered with a thin layer of adhesive are particularly suitable. For example, acrylic microsphere adhesives, available from Craig Adhesives and Coatings Co., under the tradename CRAIGSTICK 3991 and Advanced Polymers International, Inc. under the tradename GEL-TAC 201 can be used. Other suitable microsphere adhesives may contain inorganic particles such as silica, clay, and titanium dioxide, or organic particles such as poly(methyl methacrylate). However, in the present invention, it is important that the microsphere adhesive contain carboxylic acid groups, capable of cross-linking with the binder adhesive. Preferably, the microsphere adhesive is a carboxylated acrylic adhesive.

Conventional binder adhesives having functional carboxylic acid groups for cross-linking with the microsphere adhesive are used to prepare the adhesive coatings of this invention. Preferably, carboxylated acrylic binder adhesives are used. For example, ACRONAL 3432, available from BASF Corp can be used. The binder adhesive must be compatible with the microsphere adhesive so that the polymer chains of the microsphere adhesive can penetrate into the binder adhesive matrix before cross-linking.

For the PSA articles of this invention, it is important that a cross-linking agent be used to provide a cross-linked polymer network in the adhesive composition. The cross-linking agent is a polyfunctional aziridine such as trimethylolpropane-tris-(b-(n-aziridinyl)propionate or pentaerythritol-tris-(b-(n-aziridinyl)propionate. The polyfunctional aziridines are very reactive with materials containing active hydrogen such as carboxylated polymers. They are miscible in water, especially, pentaerythritol-tris (b-N-aziridinyl) propionate which is 100% soluble in water. The high solubility of the polyfunctional aziridines makes them particularly suitable for an aqueous adhesive system. The polyfunctional aziridine is added to the adhesive coating mixture just prior to use. At this point, the acidic groups in the binder adhesive have limited availability to react with the aziridine because they become neutralized with a low boiling volatile amine like ammonia The mixture of binder adhesive and aziridine has a pot life of about 18 to 36 hours.

Suitable backing materials for the pressure-sensitive adhesive article, include but are not limited to, resin-saturated paper, clay-coated paper and plain paper. In some instances, the porosity of the paper may need to be controlled for better adhesive anchorage, depending on the adhesive coating methods utilized. The adhesive composition can be coated directly on the backing material with a Mayer rod coating method, reverse roll coating method, or other similar conventional coating method.

The adhesive coating composition is prepared by forming a mixture of the cross-linking agent, microsphere adhesive, and binder adhesive. The cross-linking agent is typically added to a pre-mixture of microsphere adhesive and binder adhesive. The final mixture comprises about 0.001 to about 2 weight percent by solids of the cross-linking agent, about 30 to about 80 weight percent by solids of the microsphere adhesive, and about 20 to about 70 weight percent by solids of the binder adhesive.

When the microsphere adhesive and binder adhesive are mixed together, the polymer chains from the two adhesives intertwine. As the solvents evaporate during the drying process, the binder adhesive is cross-linked by the cross-linking agent to form a cross-linked binder adhesive polymer network. The polymer chains from the microsphere adhesive penetrate this cross-linked polymer network, and the functional carboxylic acid groups in the polymer chains, via the cross-linking agent, cross-link with the functional carboxylic acid groups in the binder adhesive, so that the microsphere adhesive becomes fixed in the polymer network. It should be understood that not all of the microspheres chemically bond to the cross-linked binder polymer network; some of the microspheres are simply dispersed in the network.

The pressure-sensitive adhesive articles of this invention are particularly suitable for use on transparent imaging film, such as polyester films having an ink or toner receptive coating. For example, a pressure-sensitive adhesive tape can be placed on one edge of a transparent imaging sheet, rendering that portion of the sheet opaque and making it suitable for processing in copiers and printers.

The invention is further illustrated in the following examples using the below test methods, but these examples should not be construed as limiting the scope of the invention.

Test Methods
Peel Strength

The adhesive coated paper web was cut into 0.375 inch wide tape which was machine-laminated on one edge of various transparent imaging sheets. The peel strength of the pressure-sensitive adhesive tapes on the transparent sheets was measured on a 3M90 slip/peel tester (Instrumentors, Inc., Strongsville, Ohio). The peel tester was set to measure 180° average peel strength of 25 seconds with a speed of 12 inches per minute. The dwell time of the adhesive tape on the transparent sheets was 3 days, unless otherwise specified.

EXAMPLES

In the following Examples, various trade names are used to denote certain ingredients used to prepare the inventive articles, and include the following:

ACRONAL 3432: an acrylic pressure-sensitive adhesive, available from BASF Corp.

CRAIGSTIK 3991 series: acrylic microsphere adhesives, available from Craig Adhesives and Coatings Co.

GEL-TAC 201 series: acrylic microsphere adhesives, available from Advanced Polymers International, Inc.

XAMA-7: a polyfunctional aziridine, available from the BFGoodrich Company.

In the following Examples, the adhesive tapes were laminated on various transparent imaging sheets such as 348 FILM, 355 FILM, 214 FILM, and 651 FILM which are ink jet or electrophotographic transparent imaging films, available from Arkwright Inc. (Fiskeville, R.I. 02823). 348 film and 355 film are ink jet imaging films. 214 film and 651 film are electrophotographic imaging films.

Example 1

An adhesive composition was formed as follows: 0.1 kg of XAMA-7 was dissolved in 4.9 kg of water to form 2 weight percentage (wt %) water solution of XAMA-7. 6.0 kg of CRAIGSTIK 3991 PIHT and 9.0 kg of ACRONAL 3432 were added to a container and mixed for 5 minutes. Next, 0.75 kg of the water solution of XAMA-7 was added to the adhesive mixture while stirring. This mixture was then stirred for 30 minutes to form the final adhesive.

The adhesive was coated with a #10 Mayer rod onto a paper web (Georgia Pacific, Ardor bond 16 paper) at 30 feet per minute (FPM). The drying temperature was set at 250°, 250° and 250° F. for three oven zones (10 feet long each). The adhesive coated paper roll was then cut into 0.75 inch wide tapes which were laminated to a transparent imaging film. The transparent film with the pressure-sensitive adhesive tape was further slit into transparent sheets (usually, 8.5×11 inch square) bearing 0.75 inch wide tapes on one edge.

The peel strengths of the PSA tape (0.375 inch wide, three months dwell) were 26 grams on 355 film, 13 grams on 214 film and 31 grams on 651 film, respectively. The adhesive tape was applied to the non-imaging side of the transparent films. When the PSA tape was peeled off from the transparent sheets, there was no visible residue marks on the transparent sheets.

Example 2

A PSA tape was formed in the same way as in Example 1, but with a different adhesive composition. The adhesive was formed as follows: 7.5 kg of CRAIGSTIK 3991 PIHT and 7.5 kg of ACRONAL 3432 were added to a container and mixed for 5 minutes. Next, 0.15 kg of 2 wt % water solution of XAMA-7 (as described in Example 1) was added to the adhesive mixture while stirring. This mixture was then stirred for 30 minutes to form the final adhesive.

The peel strengths of the PSA tape (0.375 inch wide, three months dwell) were 99 grams on 355 film, 67 grams on 214 film and 91 grams on 651 film, respectively. When the PSA tape was peeled off from the transparent sheets, there were no visible residue marks on the transparent sheets.

Example 3

A PSA tape was formed in the same way as in Example 1, but with a different adhesive composition and coating condition. The adhesive was formed as follows: 6.0 kg of CRAIGSTIK 3991 PIHT and 9.0 kg of ACRONAL 3432 were added to a container and mixed for 5 minutes. Next, 0.375 kg of 2 wt % water solution of XAMA-7 (as described in Example 1) was added to the adhesive mixture while stirring. This mixture was then stirred for 30 minutes to form the final adhesive.

The adhesive was coated with a #10 Mayer rod onto a paper web (Georgia Pacific, Ardor bond 16) at 100 feet per minute. The drying temperature was set at 300°, 300° and 250° F. for three oven zones (10 feet long each). The adhesive-coated paper roll was then cut into 0.75 inch wide tapes which were laminated to a transparent imaging film (355 film). The transparent film with the pressure-sensitive adhesive tape was further slit into transparent sheets bearing 9.5 mm wide tapes.

The peel strength of the PSA tape (0.375 inch wide, one week dwell) was 32 rams on 355 film. When the PSA tape was peeled off from the transparent sheets, there were no visible residue marks on the transparent sheets.

Example 4

An adhesive was formed as follows: 6.0 kg of CRAIGSTIK 3991 PIHT and 9.0 kg of ACRONAL 3432 were added to a container and mixed for 5 minutes. Next, 0.75 kg of 2 wt % water solution of XAMA-7 was added to the adhesive mixture while stirring. This mixture was then stirred for 30 minutes to form the final adhesive.

The final adhesive was coated with a #16 Mayer rod onto a paper web (Georgia Pacific, Ardor bond 20) at 100 feet per minute. The drying temperature was set at 300°, 300° and 250° F. for three oven zones (10 feet long each). The coat weight was 20 g/m$^2$. The adhesive coated paper was laminated onto Fletcher 823 #42 C1S SCK release liner (Fletcher Coated Products, Inc.) and then cut into 0.75 inch wide tapes which were laminated to a transparent imaging film (355 film). The transparent film with the pressure-sensitive adhesive tape was further cut into transparent sheets bearing 0.375 inch wide tapes.

The peel strength of the PSA tape (0.375 inch wide, two hours dwell) was 59 grams on 355 film. When the PSA tape was peeled off from the transparent sheets, there were no visible residue marks on the transparent sheets.

Example 5

A PSA tape was formed from the adhesive composition described in Example 4. The adhesive was coated with a #10 Mayer rod onto a paper web (Georgia Pacific, Ardor bond 16) at 100 feet per minute. The drying temperature was set at 300°, 300° and 250° F. for three oven zones (10 feet long each). The coat weight was 10.5 g/m$^2$. The adhesive-coated paper roll was laminated onto Fletcher 823 42# C1S SCK release liner (Fletcher Coated Products, Inc.) and then cut into 0.75 inch wide tapes which were laminated to a transparent imaging film (355 film). The transparent web with the pressure-sensitive adhesive tape was further cut into transparent sheets bearing 0.375 inch wide tapes.

The peel strength of the PSA tape (0.375 inch wide, two hours dwell) was 13 grams on 355 film. When the PSA tape was peeled off from the transparent sheets, there were no visible residue marks on the transparent sheets.

Example 6

A PSA tape was formed in the same way as in Example 5, but with a #14 Mayer rod. The coat weight was 13.6 g/m$^2$.

The peel strength of the PSA tape (0.375 inch wide two hours dwell) was 30 grams on 355 film. When the PSA tape was peeled off from the transparent sheets, there were no visible residue marks on the transparent sheets.

Example 7

A PSA tape was formed in the same way as in Example 5, but with a #16 Mayer rod. The coat weight was 15 g/m$^2$.

The peel strength of the PSA tape (0.375 inch wide, two hours dwell) was 76 grams on 355 film. When the PSA tape was peeled off from the transparent sheets, there were no visible residue marks on the transparent sheets.

Example 8

A PSA tape was formed in the same way as in Example 7, but with a different adhesive composition. The adhesive was formed as follows: 6.0 kg of CRAIGSTIK 3991 PIHT and 9.0 kg of ACRONAL 3432 were added to a container and mixed for 10 minutes. Next, 0.90 kg of 2 wt. % water solution of XAMA-7 was added to the adhesive mixture while stirring. This mixture was then stirred for 30 minutes to form the final adhesive. The coat weight for the adhesive coating was 16.5 g/m$^2$.

The peel strength of the PSA tape (0.375 inch wide, two hours dwell) was 104 grams on 355 film. When the PSA tape was peeled off from the transparent sheet, there were no visible residue marks on the transparent sheets.

Example 9

A PSA tape was formed from the adhesive described in Example 4. The adhesive was coated with a #14 Mayer rod onto a paper web (Georgia Pacific, Ardor bond 16) at 100 feet per minute. The dying temperature was set at 275°, 275° and 250° F. for three oven zones (10 feet long each). The adhesive-coated paper roll was laminated onto Fletcher 823-42# C1S SCK release liner (Fletcher Coated Products, Inc.) and then cut into 0.75 inch wide tapes which were laminated to a transparent imaging film. The transparent film with the pressure-sensitive adhesive tape was further cut into transparent sheets bearing 0.375 inch wide tapes. The coat weight was 15.7 g/m$^2$.

The peel strength of the PSA tape (0.375 inch wide, two hours dwell) was 35 grams on 355 film. When the PSA tape was peeled off from the transparent sheets, there were no visible residue marks on the transparent sheets.

Example 10

A PSA tape was formed in the same way as in Example 9, but with a #12 Mayer rod. The coat weight was 15.7 g/m$^2$.

The peel strength of the PSA tape (0.375 inch wide, two hours dwell) was 20 grams on 355 film. When the PSA tape was peeled off from the transparent sheets, there were no visible residue marks on the transparent sheets.

Example 11

A PSA tape was formed in the same way as in Example 9, but with the following adhesive composition: 6.0 kg of CRAIGSTIK 3991 PIHT, 9.0 kg of ACRONAL 3432 and 2.835 kg of water were mixed for 5 minutes. Then, 0.75 kg of 2 wt % water solution of XAMA-7 was added to the adhesive mixture while stirring. The mixture was mixed for 30 minutes to make the final adhesive. The coat weight was 8.9 g/M$^2$.

The peel strength of the PSA tape (0.375 inch wide, two hours dwell) was 10 grams on 355 film. When the PSA tape was peeled off from the transparent sheets, there were no visible residue marks on the transparent sheets.

Example 12

A PSA tape was formed using the following adhesive composition. The adhesive was formed by adding 0.15 kg of XAMA-7 water solution (2% wt of XAMA-7 in water), 1.2 kg of water, 8.10 kg of CRAIGSTIK 3991 PIHT and 5.55 kg of ACRONAL 3432 to a container and mixing them together. This mixture was then stirred for 30 minutes to form the final adhesive.

The adhesive was coated with a #16 Mayer rod onto a paper web (Georgia Pacific, Ardor bond 16) at 100 feet per minute. The drying temperature was set at 275°, 275° and 250° F. for three oven zones (10 feet long each). The adhesive-coated paper roll was laminated onto Fletcher 823-42# C1S SCK release liner (Fletcher Coated Products, Inc.) and then cut into 0.75 inch wide tapes which were laminated to a transparent imaging film (355 film). The transparent film with the pressure-sensitive adhesive tape was further cut into transparent sheets being 0.375 inch wide tapes. The coat weight was 15.7 g/m$^2$.

The peel strength of the PSA tape (0.375 inch wide, two hours dwell) was 74.4 grams on 355 film. When the PSA tape was peeled off from the transparent sheets, there were no visible residue marks on the transparent sheets.

Example 13

A PSA tape was formed in the same way as in Example 12, but with the following adhesive composition: 0.15 kg of XAMA-7 water solution (2% wt XAMA-7 in water), 0.75 kg of water, 5.397 kg of CRAIGSTIK 3991 PIHT and 3.7 kg of ACRONAL 3432 were mixed together to form a final adhesive. The adhesive was coated with a #14 Mayer rod and the coat weight was 13.6 g/m$^2$.

The peel strength of the PSA tape (0.375 inch wide, two hours dwell) was 21.3 grams on 355 film. When the PSA tape was peeled off from the transparent sheets, there were no visible residue marks on the transparent sheets.

Example 14

A PSA tape was formed in the same way as in Example 12, but with the following adhesive composition: 0.225 kg of 2 wt % XAMA-7 water solution was dissolved in 1.35 kg of water, and 8.1 kg of CRAIGSTIK 3991 PIHT, 5.55 kg of ACRONAL 3432 and the water solution of XAMA-7 were mixed together to form a final adhesive. The adhesive was coated with a #14 Mayer rod and the coat weight was 14.6 g/m$^2$.

The peel strength of the PSA tape (0.375 inch wide, two hours dwell) was 41 grams on 355 film. When the PSA tape was peeled off from the transparent sheets, there were no visible residue marks on the transparent sheets.

Example 15

A PSA tape was formed in the same way as in Example 14, but with a #16 Mayer rod. The coat weight was 16.6 g/m$^2$.

The peel strength of the PSA tape (0.375 inch wide, two hours dwell) was 44 grams on 355 film. When the PSA tape was peeled off from the transparent sheets, there were no visible residue marks on the transparent sheets.

Example 16

A PSA tape was formed in the same way as in Example 14, except the paper base was Georgia Pacific Ardor Bond 20 paper and a #16 Mayer rod was used for the adhesive coating. The coat weight was 17.4 g/m$^2$.

The peel strength of the PSA tape (0.375 inch wide, two hours dwell) was 46 grams on 355 film. When the PSA tape was peeled off from the transparent sheets, there were no visible residue marks on the transparent sheets.

Example 17

A PSA tape was formed in the same way as in Example 14, except the paper base was Georgia Pacific Ardor Bond 20 paper and a #18 Mayer rod was used for the adhesive coating. The coat weight was 17.9 g/m$^2$.

The peel strength of the PSA tape (0.375 inch wide, two hours dwell on 355 film) was 49 grams. When the PSA tape was peeled off from the transparent sheets, there were no visible residue marks on the transparent sheets.

Example 18

An adhesive composition was formed as follows: 4.55 kg of ACRONAL 3432 and 6.65 kg of GEL-TAC 201C were added to a container and mixed for 5 minutes. 3.38 kg of water and 0.42 kg of XAMA-7 water solution (2 wt % water solution) were then added to the above adhesive mixture. The final adhesive composition was mixed for 30 minutes before its use.

The adhesive was coated with reverse roll coating method to a paper web (2.85 mil latex saturated paper, Crown Vantage) at 100 feet per minute. The adhesive coating was dried at 250 F. in a 30 feet long oven. The coat weight was about 6.5 g/m$^2$.

The adhesive coated paper was laminated on a release liner (823-42# C1S SCK, Fletcher Coated Products, Inc.) and then slit into 0.75 inch wide adhesive tapes. The tape was machine laminated on a transparent imaging film (355 film) which was further slit into transparent imaging sheets bearing 0.375 inch wide adhesive stripe.

The peel strength of the adhesive tape (0.375 inch wide, 3 days dwell on 355 film) was about 29 grams. When the adhesive tape was peeled off from the transparent sheets, there were no visible residue marks on the transparent sheets.

Example 19

A PSA tape was formed in the same way as in Example 18, except that the paper was 3.5 mil latex saturated paper from Nicolaus Paper, Inc. The coat weight was about 12 g/m$^2$.

The peel strength of the adhesive tape (0.375 inch wide, 3 days dwell on 355 film) was about 22 grams. When the adhesive tape was peeled off from the transparent sheets, there were no visible residue marks on the transparent sheets.

Example 20

A PSA tape was formed in the same way as in Example 18, except that the paper was Ardor Bond #20 from Georgia Pacific. The coat weight was about 12 g/m$^2$.

The adhesive tape was laminated on 355 film with 4 pound rubber covered roller pressure. The peel strength of the adhesive tape (0.375 inch wide, 10 minutes dwell on 355 film) was about 8 grams. When the adhesive tape was peeled off from the transparent sheets, there were no visible residue marks on the transparent sheets.

Example 21

A PSA tape was formed in the same way as in Example 18, except that the paper was 4 mil Mohawk paper from Mohawk Inc. The coat weight was about 12 g/m$^2$.

The adhesive tape was machine laminated on 355 film. The peel strength of the adhesive tape (0.375 inch wide, 3 days dwell on 355 film) was about 42 grams. When the adhesive tape was peeled off from the transparent sheets, there were no visible residue marks on the transparent sheets.

Example 22

An adhesive was formed as described in Example 18. The adhesive was coated with #12 Mayer rod on 3.5 mil latex saturated paper from Nicolaus Paper. The coat weight was about 14 g/m$^2$.

The adhesive tape was machine laminated on 355 film. The peel strength of the adhesive tape (0.375 inch wide, 2 hours dwell on 355 film) was about 13 grams. When the adhesive tape was peeled off from the transparent sheets, there were no visible residue marks on the sheets.

Example 23

An adhesive was formed as described in Example 18. The adhesive was coated with #12 Mayer rod on 2.85 mil latex saturated paper from Crown Vantage Inc. The coat weight was about 15 g/m².

The adhesive tape was machine laminated on 355 film. The peel strength of the adhesive tape (0.375 inch wide, 2 hours dwell on 355 film) was about 22 grams. When the adhesive tape was peeled off from the transparent sheets, there were no visible residue marks on the transparent sheets.

Example 24

An adhesive was formed as described in Example 18. The adhesive was coated with #14 Mayer rod Ardor bond #20 paper from Georgia Pacific. The coat weight was about 11 g/m².

The adhesive tape was machine laminated on 355 film. The peel strength of the adhesive tape (0.375 inch wide, 2 hours dwell on 355 film) was about 24 grams. When the adhesive tape was peeled off from the transparent sheets, there were no visible residue marks on the transparent sheets.

Example 25

An adhesive was formed as follows: 0.35 kg of Xama-7 water solution, 4.158 kg of water, 3.85 kg of Acronal 3432 and 5.642 kg of Gel-Tac 201C were mixed together for 40 minutes. The above Xama-7 water solution was formed as follows: 0.12 kg of Xama-7, 5.28 kg of water and 0.60 kg of 29.0 v/v % ammonium hydroxide water solution. The adhesive composition was coated with #18 Mayer rod latex saturated paper from Nicolaus Paper Inc. The coat weight was about 12 g/m².

The adhesive tape was machine laminated on 348 film. The peel strength of the adhesive tape (0.375 inch wide, 7 days dwell on 348 film) was about 40 grams. When the adhesive tape was peeled off from the transparent sheets, there were no visible residue marks on the transparent sheets.

What is claimed is:

1. A pressure-sensitive adhesive article comprising a backing material coated with a pressure-sensitive adhesive coating comprising microspheres chemically bonded to a cross-linked polymer network, wherein the pressure-sensitive adhesive coating is prepared from a mixture, comprising:
   a) about 0.001 to about 2% by solid weight of a multi-functional aziridine cross-linking agent;
   b) about 30 to about 80% by solid weight of a microsphere adhesive having carboxylic acid functional groups; and
   c) about 20 to about 70% by solid weight of binder adhesive having carboxylic acid functional groups, and a portion of the microspheres protrude from the adhesive coating.

2. The pressure-sensitive article of claim 1, wherein the article is in the form of a tape.

3. The pressure-sensitive adhesive tape of claim 2, wherein the backing material is selected from the group consisting of latex-saturated paper, plain paper, and clay-coated paper.

4. The pressure-sensitive adhesive article of claim 1, wherein the binder adhesive is a carboxylated acrylic adhesive.

5. The pressure-sensitive adhesive article of claim 1, wherein the microsphere adhesive is a carboxylated acrylic adhesive.

6. The pressure-sensitive adhesive of claim 1, wherein the pressure-sensitive adhesive coating is prepared from an aqueous mixture.

7. The pressure-sensitive adhesive article of claim 1, wherein the weight of the adhesive coating is 5 to 18 grams per square meter (g/m²).

8. A transparent imaging film, comprising the pressure-sensitive article of claim 1, wherein the article's adhesive coating is adhered to a surface of the film.

9. The imaging film of claim 8, wherein the film is a polyester film.

10. A transparent imaging polyester film, comprising at least one surface coated with an ink-receptive coating, wherein a pressure-sensitive adhesive article is adhered to a surface of the film by means of an adhesive coating comprising microspheres chemically bonded to a cross-linked polymer network, and wherein the adhesive coating is prepared from a mixture, comprising:
    a) about 0.001 to about 2% by solid weight of a multi-functional aziridine cross-linking agent;
    b) about 30 to about 80% by solid weight of a microsphere adhesive having carboxylic acid functional groups; and
    c) about 20 to about 70% by solid weight of binder adhesive having carboxylic acid functional groups; and a portion of the microspheres protrude from the adhesive coating.

11. A transparent polyester imaging film, comprising at least one surface coated with a toner-receptive coating, wherein a pressure-sensitive adhesive article is adhered to a surface of the film by means of an adhesive coating comprising microspheres chemically bonded to a cross-linked polymer network, and wherein the adhesive coating is prepared from a mixture, comprising:
    a) about 0.001 to about 2% by solid weight of a multi-functional aziridine cross-linking agent;
    b) about 30 to about 80% by solid weight of a microsphere adhesive having carboxylic acid functional groups; and
    c) about 20 to about 70% by solid weight of binder adhesive having carboxylic acid functional groups; and a portion of the microspheres protrude from the adhesive coating.

* * * * *